US012350959B2

(12) United States Patent
Brown

(10) Patent No.: US 12,350,959 B2
(45) Date of Patent: Jul. 8, 2025

(54) PERSONAL PAINT AND BRUSH HOLDER APPARATUS

(71) Applicant: Arthur Brown, Houston, TX (US)

(72) Inventor: Arthur Brown, Houston, TX (US)

( * ) Notice: Subject to any disclaimer, the term of this patent is extended or adjusted under 35 U.S.C. 154(b) by 116 days.

(21) Appl. No.: 18/243,521

(22) Filed: Sep. 7, 2023

(65) Prior Publication Data

US 2025/0083471 A1    Mar. 13, 2025

(51) Int. Cl.
*B44D 3/12* (2006.01)
*A45F 5/00* (2006.01)
*A45F 5/02* (2006.01)

(52) U.S. Cl.
CPC .............. *B44D 3/123* (2013.01); *A45F 5/021* (2013.01); *B44D 3/128* (2013.01); *A45F 5/1575* (2025.01)

(58) Field of Classification Search
CPC ......... B44D 3/123; B44D 3/128; A45F 5/021; A45F 5/1575
USPC .......................................................... 220/736
See application file for complete search history.

(56) References Cited

U.S. PATENT DOCUMENTS

| | | | | | |
|---|---|---|---|---|---|
| 1,190,428 | A | | 7/1916 | Langford | |
| 2,342,454 | A | * | 2/1944 | Coyliondro | B65D 25/02 220/702 |
| 2,435,036 | A | * | 1/1948 | Ferguson | B44D 3/128 220/701 |
| 2,715,478 | A | * | 8/1955 | Andersen | B44D 3/128 248/110 |
| 3,004,315 | A | * | 10/1961 | Masure | A41D 13/04 2/51 |
| 3,729,158 | A | | 4/1973 | Nagy | |
| 4,006,991 | A | * | 2/1977 | Whalen | B05C 17/00 401/121 |
| 4,561,556 | A | * | 12/1985 | Bendix | B44D 3/123 220/699 |
| 5,490,618 | A | * | 2/1996 | Davidson | B44D 3/14 224/661 |
| 6,283,345 | B1 | | 9/2001 | Butschat | |
| 6,493,901 | B1 | * | 12/2002 | Jones | B44D 3/12 220/570 |
| 6,719,178 | B1 | * | 4/2004 | Taylor | A45F 3/02 224/625 |
| 6,769,136 | B1 | * | 8/2004 | Martelly | A41D 13/0012 220/570 |
| 8,251,269 | B2 | * | 8/2012 | Winneur | A45C 9/00 224/652 |
| 8,418,309 | B1 | | 4/2013 | Williams | |
| 9,463,662 | B1 | | 10/2016 | Sotolongo | |
| 10,836,206 | B2 | | 11/2020 | Keane | |
| 11,369,184 | B1 | | 6/2022 | Hooper | |
| 2003/0111497 | A1 | | 6/2003 | Lukaris | |
| 2006/0081637 | A1 | * | 4/2006 | Lundy | B44D 3/121 220/505 |

FOREIGN PATENT DOCUMENTS

| | | |
|---|---|---|
| GB | 1190428 | 5/1970 |

* cited by examiner

*Primary Examiner* — Don M Anderson
*Assistant Examiner* — Eric C Baldrighi

(57) ABSTRACT

A personal paint and brush holder apparatus for holding paint and brushes near a body of a user includes a pouch with an open top end. A waist strap and a thigh strap attach the pouch to the user. A container is removably positionable in a use position in which the pouch holds the container. The container defines a paint reservoir for holding paint. A brush holding compartment is also provided.

15 Claims, 7 Drawing Sheets

PERSONAL PAINT AND BRUSH HOLDER APPARATUS

(B) CROSS-REFERENCE TO RELATED APPLICATIONS

Not Applicable

(C) STATEMENT REGARDING FEDERALLY SPONSORED RESEARCH OR DEVELOPMENT

Not Applicable

(D) THE NAMES OF THE PARTIES TO A JOINT RESEARCH AGREEMENT

Not Applicable

(E) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(F) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to paint and brush holding apparatus and more particularly pertains to a new paint and brush holding apparatus for holding paint and brushes near a body of a user.

(2) Description Of Related Art Including Information Disclosed Under 37 CFR 1.97 and 1.98

The prior art describes myriad paint and brush holding apparatuses. However, the prior art fails to disclose such an apparatus which relies on a waist strap and a thigh strap to attach a container to a user and which defines a paint reservoir for holding paint and a brush holding compartment for holding a paintbrush.

(H) BRIEF SUMMARY OF THE INVENTION

An embodiment of the disclosure meets the needs presented above by generally comprising a pouch with an open top end and comprising a base wall, a front wall, a rear wall, and a pair of lateral walls. The front wall and the rear wall are coupled to and extend upwardly from the base wall. The lateral walls are coupled to and extend upwardly from the base wall. The lateral walls are also coupled to and extend between the front wall and the rear wall. Upper edges of the front wall and the pair of lateral walls form a rim. A waist strap is coupled to the back wall of the pouch and has a length such that the waist strap is configured to extend around a waist of a user. A thigh strap is coupled to the back wall of the pouch and is positioned downwardly from the waist strap with respect to the pouch. The thigh strap has a length such that the thigh strap is configured to extend around a thigh of the user. A container is removably positionable in a use position wherein the pouch holds the container. The container defines a paint reservoir therein configured for holding paint and having an open upper end.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(I) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(J) DETAILED DESCRIPTION OF THE INVENTION

Figure 1:
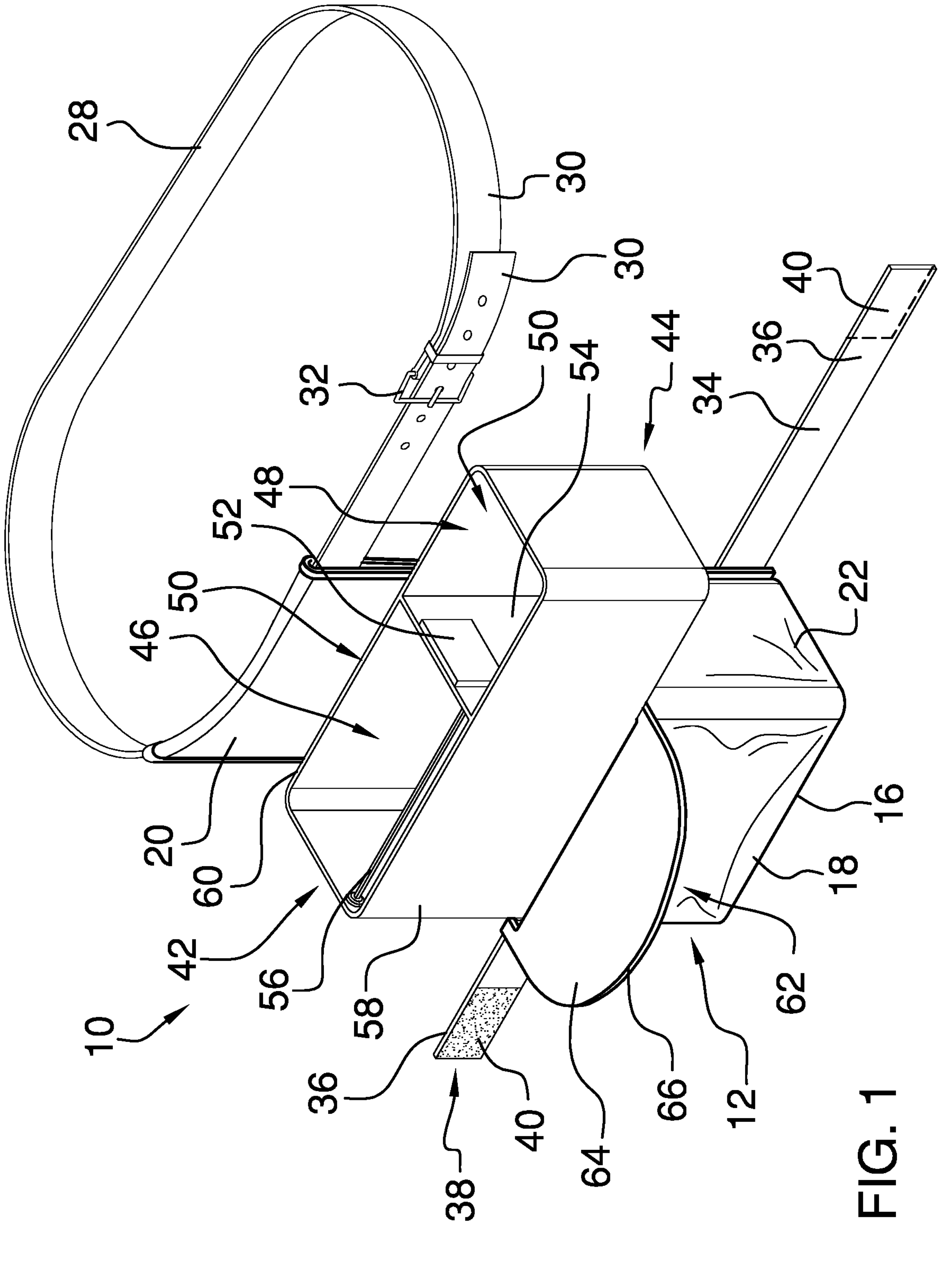
FIG. 1 is a top front side perspective view of a personal paint and brush holder apparatus according to an embodiment of the disclosure.
Figure 2:
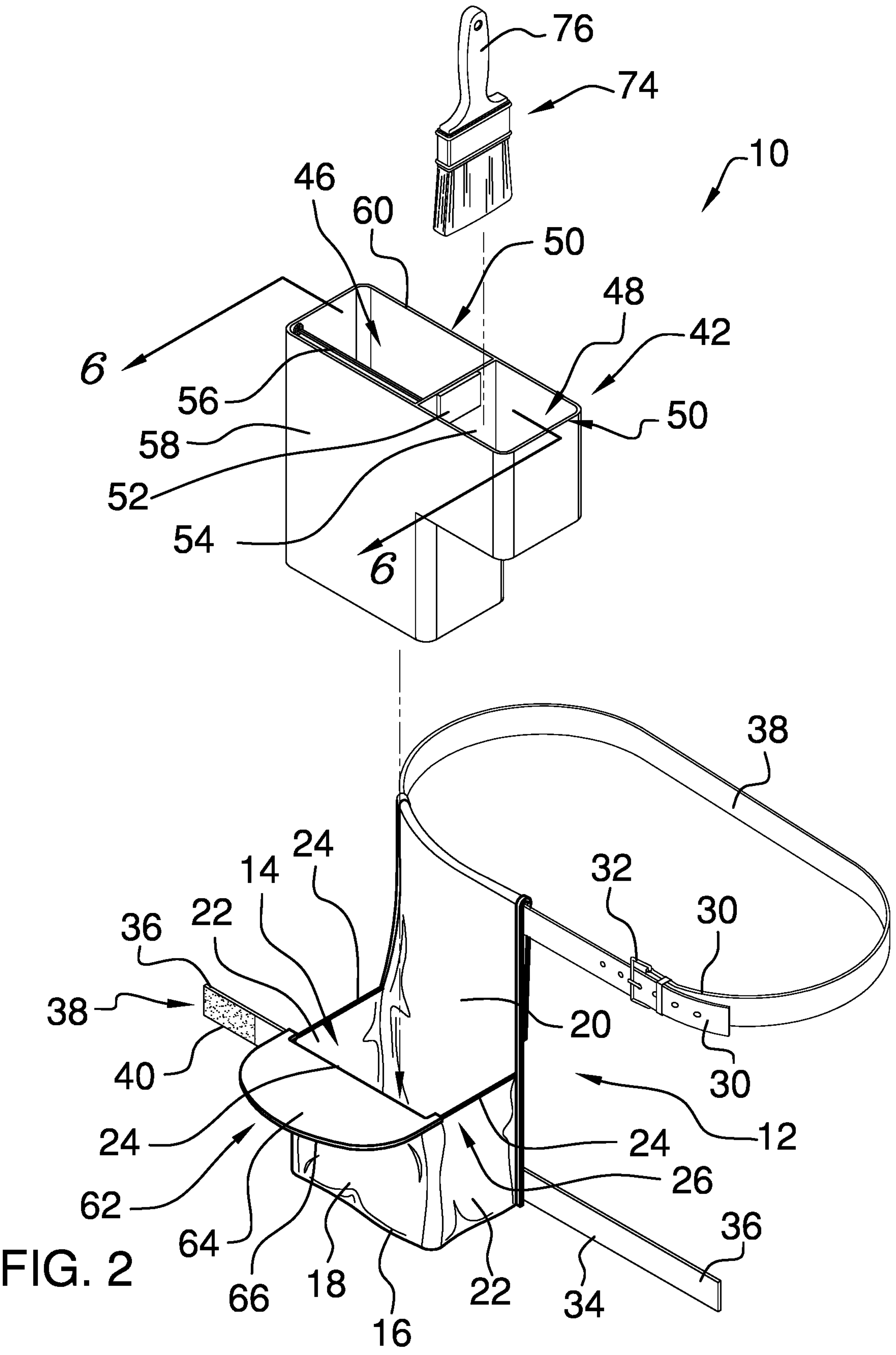
FIG. 2 is an exploded view of an embodiment of the disclosure.
Figure 3:
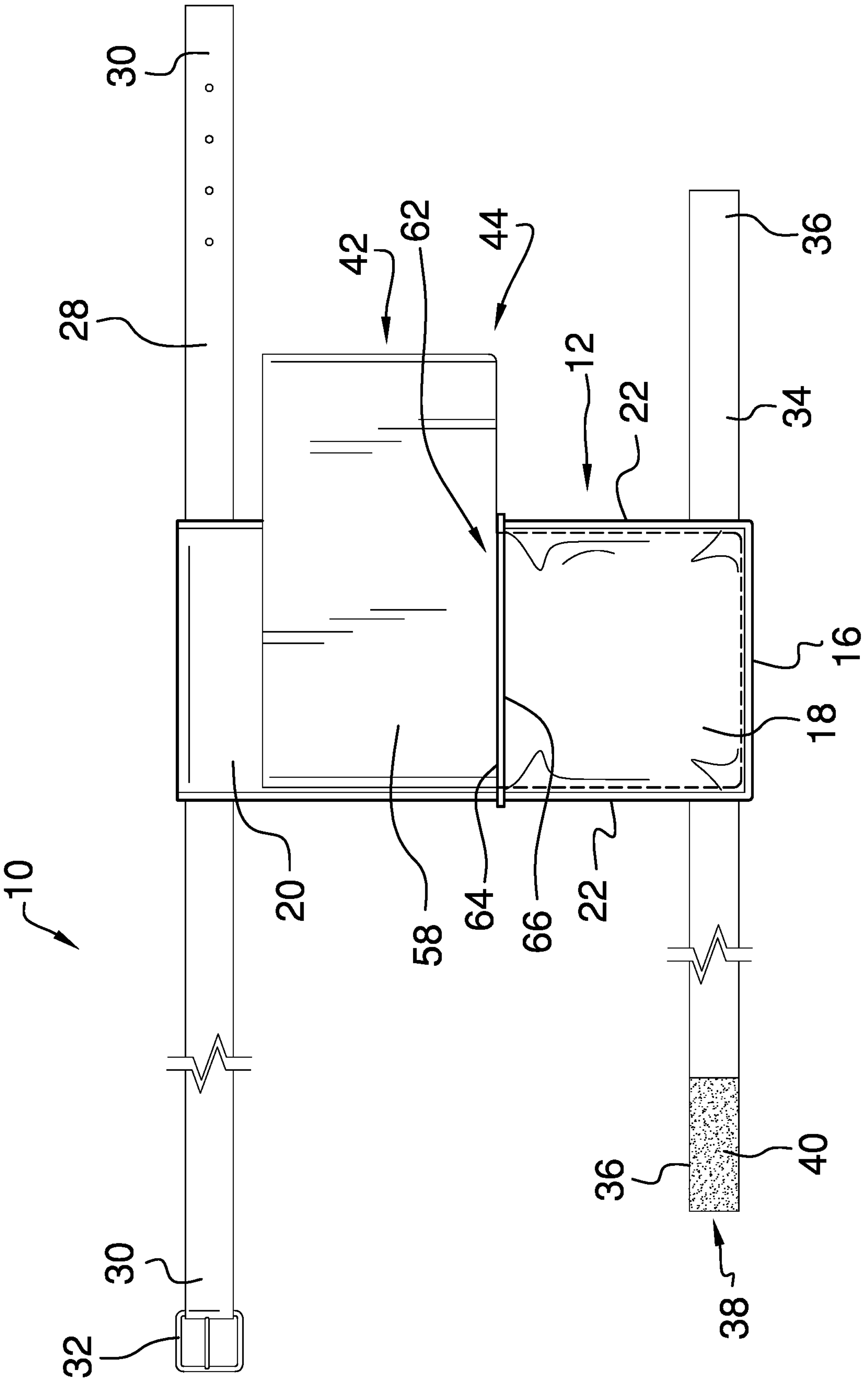
FIG. 3 is a front view of an embodiment of the disclosure.
Figure 4:
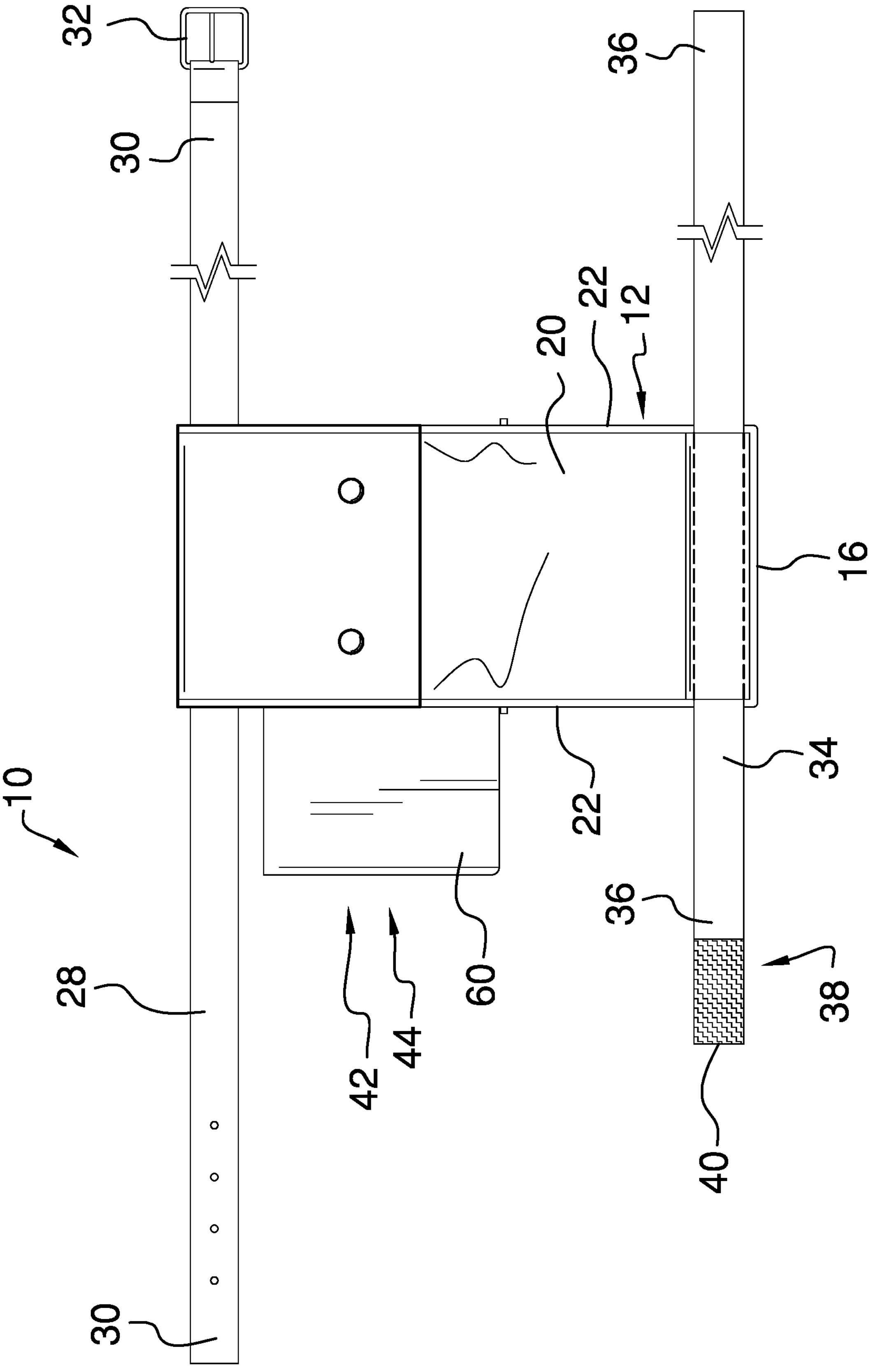
FIG. 4 is a rear view of an embodiment of the disclosure.
Figure 5:
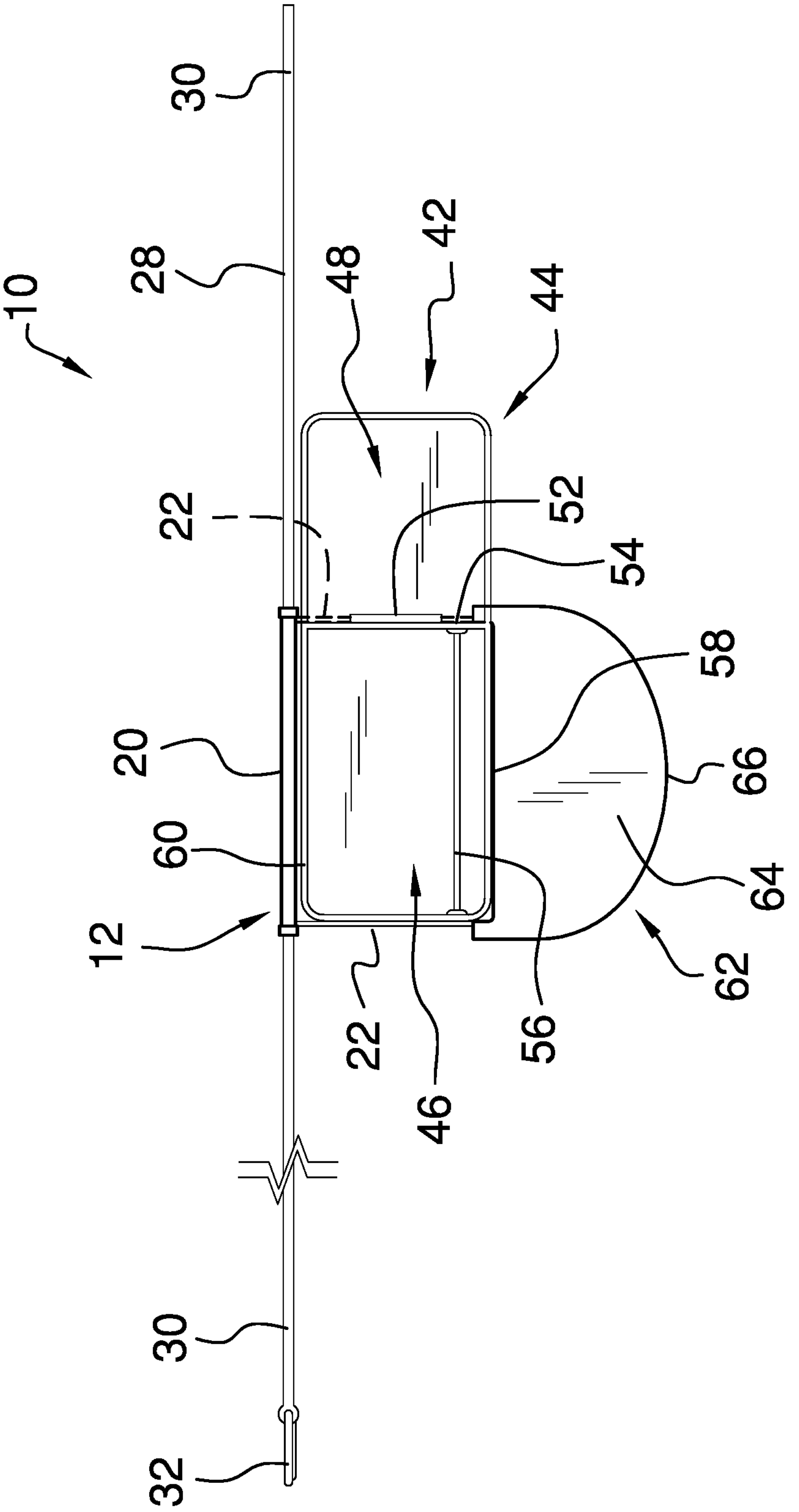
FIG. 5 is a top view of an embodiment of the disclosure.
Figure 6:
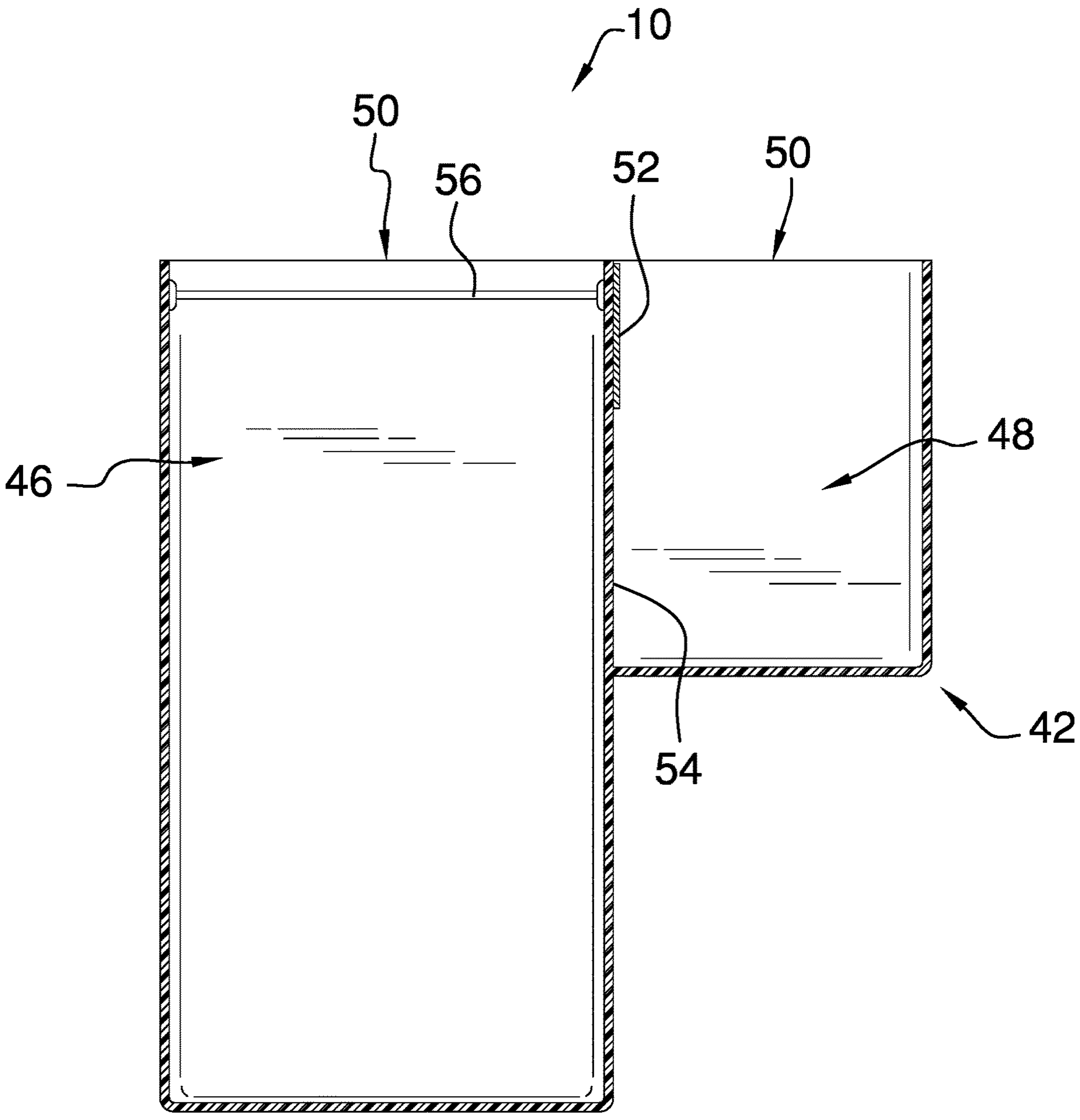
FIG. 6 is a cross section view of an embodiment of the disclosure taken from Arrows 6-6 in FIG. 2.
Figure 7:
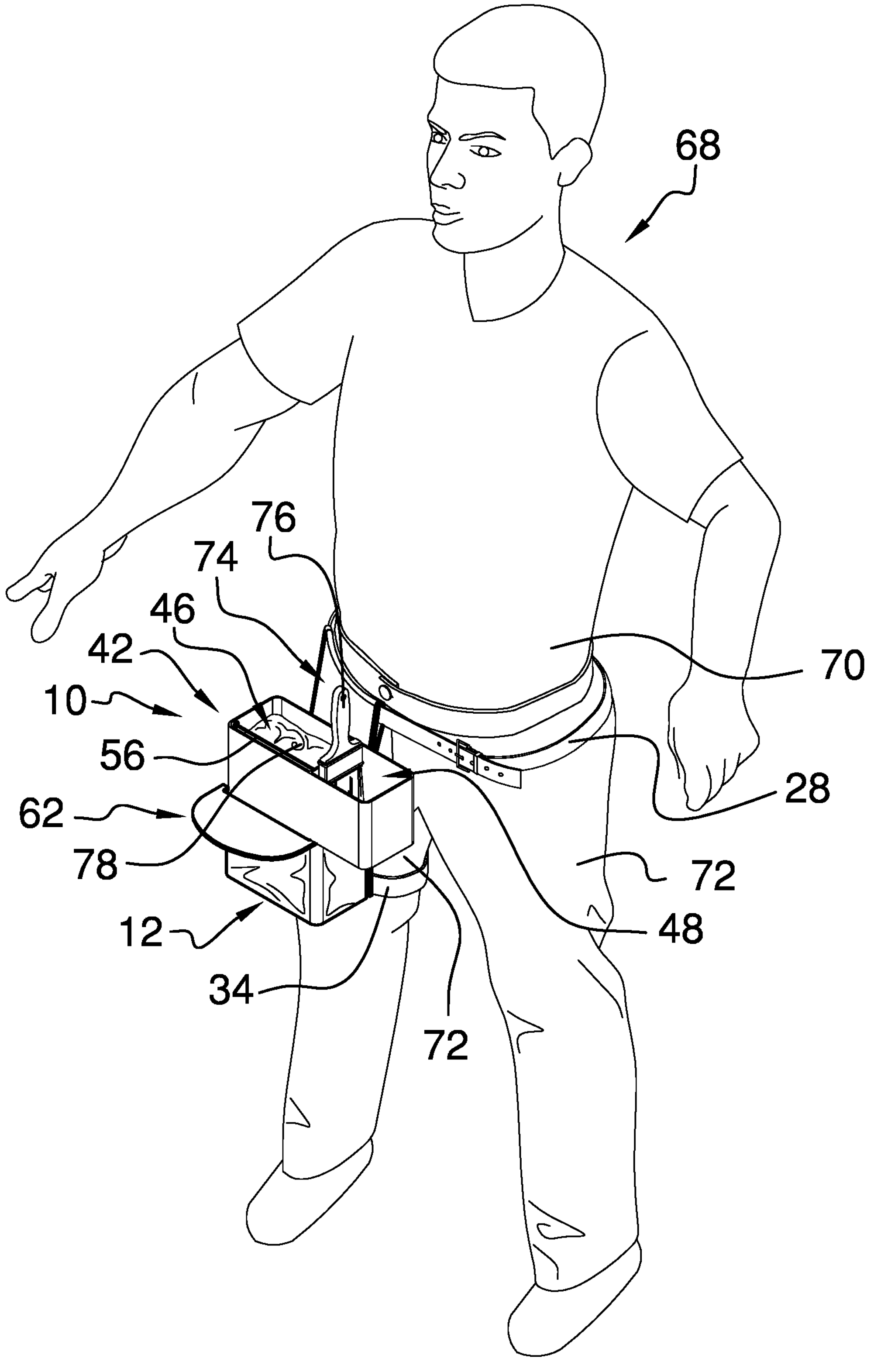
FIG. 7 is a perspective in-use view of an embodiment of the disclosure.

With reference now to the drawings, and in particular to FIGS. 1 through 6 thereof, a new paint and brush holding apparatus embodying the principles and concepts of an embodiment of the disclosure and generally designated by the reference numeral 10 will be described.

As best illustrated in FIGS. 1 through 6, the personal paint and brush holder apparatus 10 generally comprises a pouch 12 with an open top end 14 which comprises a base wall 16, a front wall 18, a rear wall 20, and a pair of lateral walls 22. The front wall 18 and the rear wall 20 are coupled to and extend upwardly from the base wall 16. The lateral walls 22 are coupled to and extend upwardly from the base wall 16. The lateral walls 22 are also coupled to and extend between the front wall 18 and the rear wall 20. Upper edges 24 of the front wall 18 and the pair of lateral walls 22 form a rim 26, and the rear wall 20 extends upwardly past the rim 26.

A waist strap 28 is coupled to the rear wall 20 of the pouch 12 and has a length such that the waist strap 28 is configured to extend around a waist 70 of a user 68. The waist strap 28 has a pair of end portions 30 which are couplable to each other to form a waist closed loop. A waist strap connector 32 is coupled to the waist strap 28 to releasably couple the pair of end portions 30 of the waist strap 28 together. The waist strap connector 32 is attached to one of the pair of end portions 30 of the waist strap 28 and is releasably couplable to another of the pair of end portions 30. The waist strap connector 32 is adjustable to adjust an inner dimension of the waist closed loop. The waist strap connector 32 comprises a buckle but may comprise a hook-and-loop connector, a clasp, or the like.

A thigh strap 34 is coupled to the rear wall 20 of the pouch 12 and is positioned downwardly from the waist strap 28 with respect to the pouch 12. The thigh strap 34 has a length such that the thigh strap 34 is configured to extend around a thigh 72 of the user 68. The thigh strap 34 has a pair of end sections 36 which are couplable to each other to form a thigh closed loop. A thigh strap connector 38 is coupled to the thigh strap 34 to releasably couple the pair of end sections 36 of the thigh strap 34 together. The thigh strap connector 38 comprises a pair of mating members 40, each of which is coupled to an associated end section 36 of the pair of end sections 36 of the thigh strap 34. The mating members 40 are couplable to each other to couple the pair of end sections 36 of the thigh strap 34 together. The thigh strap connector 38 may be adjusted to adjust an inner dimension of the thigh closed loop. The thigh strap connector 38 comprises a hook-and-loop fastener but may include a thigh strap buckle, a clasp, or the like.

A container 42 is removably positionable in a use position 44 wherein the pouch 12 holds the container 42. The container 42 defines a paint reservoir 46 and a brush holding compartment 48 in the container 42 which are laterally spaced from each other with respect to the pouch 12 when the container 42 is in the use position 44. Each of the paint reservoir 46 and the brush holding compartment 48 has an open upper end 50. The paint reservoir 46 is configured for holding paint 78, and the brush holding compartment 48 has a size such that the brush holding compartment 48 is configured for receiving a paintbrush 74. When the container 42 is in the use position 44, the brush holding compartment 48 extends laterally with respect to the pouch 12 and over the rim 26 of the pouch 12, and the paint reservoir 46 extends downwardly past the brush holding compartment 48.

A brush retainer 52 is coupled to the container 42 and is configured to retain the paintbrush 74 in the brush holding compartment 48. The brush retainer 52 comprises a magnet positioned on an interior surface 54 of the brush holding compartment 48 which magnetically adheres to the paintbrush 74 but may comprise a clip, a clamp, a hook-and-loop connector, or the like. A rod 56 is coupled to the container 42 and is positioned at the open upper end 50 of the paint reservoir 46. The rod 56 extends laterally with respect to the container 42 and is positioned closer to a front side 58 of the container 42 than a rear side 60 of the container 42. The rod 56 is configured to facilitate scraping excess paint off of the paintbrush 74.

A drip catch member 62 is coupled to the pouch 12. The drip catch member 62 is positioned on the front side 58 of the pouch 12 and extends forwardly with respect to the pouch 12 from the pouch 12. The drip catch member 62 is configured for catching paint drips from the paintbrush 74. The drip catch member 62 has a planar upper surface 64 and a convexly arcuate front edge 66.

In use, the personal paint and brush holder apparatus 10 is worn via the waist strap 28 extending around the waist 70 of the user 68 and the thigh strap 34 extending around the thigh 72 of the user 68. In such position, the pouch 12 is secured against the user 68 such that the container 42 does not move away from the user 68, leading to paint spills and dropping the paintbrush 74. More particularly, the container 42 is retained against the thigh 72 of the user 68, which places the container 42 such that the user 68 may effectively reach paint 78 contained in the paint reservoir 46 without substantially encumbering movements of the user 68. The waist strap 28 provides additional support for retaining the container 42 near the user 68 and distributing a portion of a weight of the container 42 to the user's 68 waist 70.

The brush holding compartment 48 and the brush retainer 52 secure the paintbrush 74 near the user 68. The brush holding compartment 48 may have a size such that a handle 76 of the paintbrush 74 extends out of the brush holding compartment 48 when retained against the brush retainer 52. The brush holding compartment 48 may be positioned to lie on a horizontal plane lying above the pouch 12, which allows for a space below the brush holding compartment 48 and laterally adjacent to the pouch 12 to be unencumbered.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A personal paint and brush holder apparatus comprising:

a pouch having an open top end, the pouch comprising a base wall, a front wall, a rear wall, and a pair of lateral walls, the front wall and the rear wall being coupled to and extending upwardly from the base wall, the pair of lateral walls being coupled to and extending upwardly from the base wall, the pair of lateral walls being coupled to and extending between the front wall and the rear wall, upper edges of the front wall and the pair of lateral walls forming a rim;

a waist strap being coupled to the back wall of the pouch, the waist strap having a length such that the waist strap is configured to extend around a waist of a user;

a thigh strap being coupled to the back wall of the pouch, the thigh strap being positioned downwardly from the waist strap with respect to the pouch, the thigh strap having a length such that the thigh strap is configured to extend around a thigh of the user;

a container being removably positionable in a use position wherein the pouch holds the container, the container defining a paint reservoir therein configured for holding paint, the paint reservoir having an open upper end;

a rod being coupled to the container and being positioned at the open upper end of the paint reservoir, the rod being configured to facilitate scraping excess paint off of the paintbrush; and a drip catch member being coupled to the pouch, the drip catch member being positioned on the front side of the pouch and extending forwardly with respect to the pouch from the pouch, a proximal side of the drip catch member relative to the pouch having a width greater than a length of the rod, the rod being centered relative to the proximal side of the drip catch member, the drip catch member being configured for catching paint drips from the paintbrush.

2. The apparatus of claim 1, wherein the waist strap has a pair of end portions, the pair of end portions being couplable to each other to form a waist closed loop, further comprising a waist strap connector being coupled to the waist strap, the waist strap connector being attached to one of the pair of end portions of the waist strap and being releasably couplable to another of the pair of end portions, the waist strap connector being adjustable to adjust an inner dimension of the waist closed loop.

3. The apparatus of claim 2, wherein the waist strap connector comprises a buckle.

4. The apparatus of claim 1, wherein the thigh strap has a pair of end sections, the pair of end sections being couplable to each other to form a thigh closed loop, further comprising a thigh strap connector being coupled to the thigh strap, the thigh strap connector comprising a pair of mating members, each mating member of the pair of mating members being coupled to an associated end section of the pair of end sections of the thigh strap, the pair of mating members being couplable to each other to couple the pair of end sections of the thigh strap together.

5. The apparatus of claim 4, wherein the thigh strap connector comprises a hook-and-loop fastener.

6. The apparatus of claim 1, wherein the container further defines a brush holding compartment therein having a size such that the brush holding compartment is configured for receiving a paintbrush, the brush holding compartment having an open upper end.

7. The apparatus of claim 6, wherein the paint reservoir and the brush holding compartment are laterally spaced from each other with respect to the pouch when the container is in the use position.

8. The apparatus of claim 7, wherein the brush holding compartment extends laterally with respect to the pouch and over the rim of the pouch when the container is positioned in the use position.

9. The apparatus of claim 7, wherein the paint reservoir extends downwardly past the brush holding compartment when the container is in the use position.

10. The apparatus of claim 1, wherein the rear wall extends upwardly past the rim.

11. The apparatus of claim 6, further comprising a brush retainer being coupled to the container configured to retain the paintbrush in the brush holding compartment.

12. The apparatus of claim 11, wherein the brush retainer comprises a magnet positioned on an interior surface of the brush holding compartment, the magnet being configured to magnetically adhere to the paintbrush to retain the paintbrush in the brush holding compartment.

13. The apparatus of claim 1, wherein the rod extends laterally with respect to the container, the rod being positioned closer to a front side of the container than a rear side of the container.

14. The apparatus of claim 1, wherein the drip catch member has a planar upper surface, the drip catch member having a convexly arcuate front edge.

15. A personal paint and brush holder apparatus comprising:

a pouch having an open top end, the pouch comprising a base wall, a front wall, a rear wall, and a pair of lateral walls, the front wall and the rear wall being coupled to and extending upwardly from the base wall, the pair of lateral walls being coupled to and extending upwardly from the base wall, the pair of lateral walls being coupled to and extending between the front wall and the rear wall, upper edges of the front wall and the pair of lateral walls forming a rim, the rear wall extending upwardly past the rim;

a waist strap being coupled to the back wall of the pouch, the waist strap having a length such that the waist strap is configured to extend around a waist of a user, the waist strap having a pair of end portions, the pair of end portions being couplable to each other to form a waist closed loop;

a thigh strap being coupled to the back wall of the pouch, the thigh strap being positioned downwardly from the waist strap with respect to the pouch, the thigh strap having a length such that the thigh strap is configured to extend around a thigh of the user, the thigh strap having a pair of end sections, the pair of end sections being couplable to each other to form a thigh closed loop;

a container being removably positionable in a use position wherein the pouch holds the container, the container defining a paint reservoir and a brush holding compartment in the container, the paint reservoir and the brush holding compartment being laterally spaced from each other with respect to the pouch when the container is in the use position, each of the paint reservoir and the brush holding compartment having an open upper end, the paint reservoir being configured for holding paint, the brush holding compartment having a size such that the brush holding compartment is configured for receiving a paintbrush, the brush holding compartment extending laterally with respect to the pouch and over the rim of the pouch when the container is positioned in the use position, the paint reservoir extending downwardly past the brush holding compartment when the container is in the use position;

a brush retainer being coupled to the container, the brush retainer comprising a magnet positioned on an interior surface of the brush holding compartment, the magnet being configured to magnetically adhere to the paintbrush to retain the paintbrush in the brush holding compartment;

a rod being coupled to the container and being positioned at the open upper end of the paint reservoir, the rod extending laterally with respect to the container, the rod being positioned closer to a front side of the container than a rear side of the container, the rod being configured to facilitate scraping excess paint off of the paintbrush;

a drip catch member being coupled to the pouch, the drip catch member being positioned on the front side of the pouch and extending forwardly with respect to the pouch from the pouch, the drip catch member being configured for catching paint drips from the paintbrush, the drip catch member having a planar upper surface, the drip catch member having a convexly arcuate front edge, a proximal side of the drip catch member relative to the pouch having a width greater than a length of the rod, the rod being centered relative to the proximal side of the drip catch member;

a waist strap connector being coupled to the waist strap, the waist strap connector being attached to one of the pair of end portions of the waist strap and being releasably couplable to another of the pair of end portions, the waist strap connector being adjustable to adjust an inner dimension of the waist closed loop, the waist strap connector comprising a buckle; and a thigh strap connector being coupled to the thigh strap, the thigh strap connector comprising a pair of mating members, each mating member of the pair of mating members being coupled to an associated end section of the pair of end sections of the thigh strap, the pair of mating members being couplable to each other to couple the pair of end sections of the thigh strap together, the thigh strap connector comprising a hook-and-loop fastener.

* * * * *